United States Patent
Lawson et al.

(10) Patent No.: US 6,829,639 B1
(45) Date of Patent: Dec. 7, 2004

(54) METHOD AND SYSTEM FOR INTELLIGENT GLOBAL EVENT NOTIFICATION AND CONTROL WITHIN A DISTRIBUTED COMPUTING ENVIRONMENT

(75) Inventors: Todd C. Lawson, Lindon, UT (US);
Warren D. Cave, Orem, UT (US);
Kamika Layne Fisher, Orem, UT (US)

(73) Assignee: NetVision, Inc., Orem, UT (US)

( * ) Notice: Subject to any disclaimer, the term of this patent is extended or adjusted under 35 U.S.C. 154(b) by 0 days.

(21) Appl. No.: 09/440,620

(22) Filed: Nov. 15, 1999

(51) Int. Cl.[7] .............................................. G06F 15/173
(52) U.S. Cl. ................... 709/224; 709/201; 709/202; 709/203; 709/223; 709/227; 707/10; 714/25; 714/37; 714/48; 714/51; 714/47
(58) Field of Search ................................. 709/201, 202, 709/203, 204, 223, 224, 227; 707/10; 714/25, 37, 48, 51, 57

(56) References Cited

U.S. PATENT DOCUMENTS

| | | | | |
|---|---|---|---|---|
| 5,491,791 A | * | 2/1996 | Glowny et al. | 714/37 |
| 5,592,664 A | * | 1/1997 | Starkey | 707/1 |
| 5,696,701 A | * | 12/1997 | Burgess et al. | 714/25 |
| 5,710,885 A | * | 1/1998 | Bondi | 709/224 |
| 5,721,825 A | | 2/1998 | Lawson et al. | 709/203 |
| 5,748,884 A | * | 5/1998 | Royce et al. | 709/203 |
| 5,790,789 A | * | 8/1998 | Suarez | 714/57 |
| 5,829,001 A | * | 10/1998 | Li et al. | 709/202 |
| 5,857,190 A | * | 1/1999 | Brown | 707/10 |
| 6,076,108 A | * | 6/2000 | Courts et al. | 709/227 |
| 6,122,664 A | * | 9/2000 | Boukobza et al. | 707/10 |
| 6,148,337 A | * | 11/2000 | Estberg et al. | 709/224 |
| 6,170,067 B1 | * | 1/2001 | Liu et al. | 709/224 |
| 6,178,529 B1 | * | 1/2001 | Short et al. | 714/48 |
| 6,271,845 B1 | * | 8/2001 | Richardson | 345/764 |
| 6,314,463 B1 | * | 11/2001 | Abbott et al. | 714/51 |
| 6,317,786 B1 | * | 11/2001 | Yamane et al. | 709/224 |
| 6,393,473 B1 | * | 5/2002 | Chu | 709/224 |
| 6,480,883 B1 | * | 11/2002 | Tsutsumitake | 709/203 |

* cited by examiner

*Primary Examiner*—Jack Harvey
*Assistant Examiner*—Hai V. Nguyen
(74) *Attorney, Agent, or Firm*—Kirton & McConkie; Michael F. Krieger

(57) ABSTRACT

A distributed computer environment (DCE) is disclosed that provides event globalizing of at least one event at one server in the DCE to other servers within said DCE as well as maintains a record of specific event activity over the DCE. The maintenance of the records is performed by storing a global event file comprising a list of events and a corresponding list of servers in order to identify which of the servers should receive which events, storing a local event registry comprising a list of events and a corresponding list of local event consumers in order to identify which of the local event consumers should receive which events, identifying specific events within the list of events to be monitored for a specific purpose, monitoring said specific events as they occur over the DCE, notifying a specific local event consumer of the occurrence of the specific events, and recording a log of event activity involving only the specific events.

43 Claims, 10 Drawing Sheets

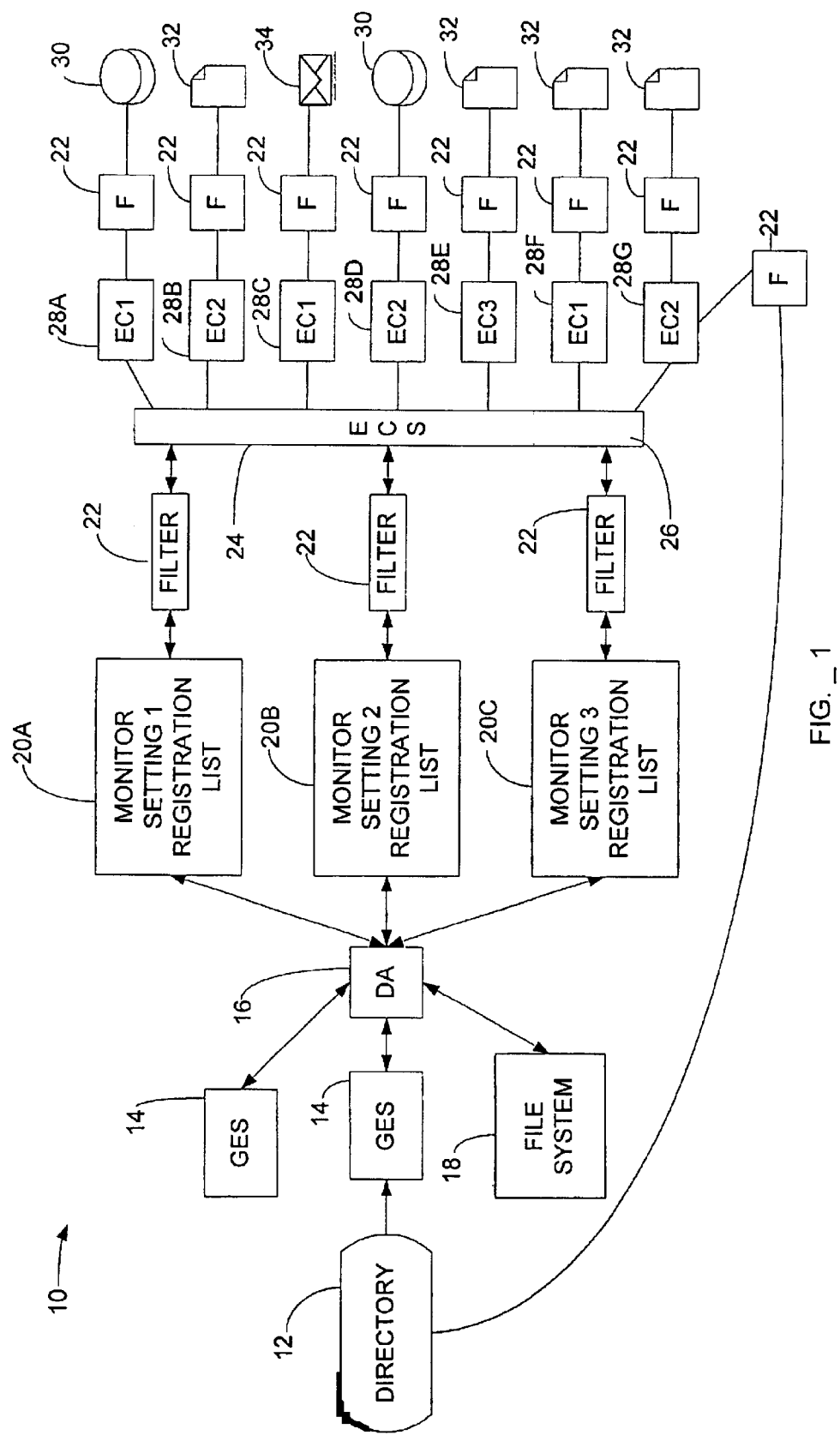
FIG._1

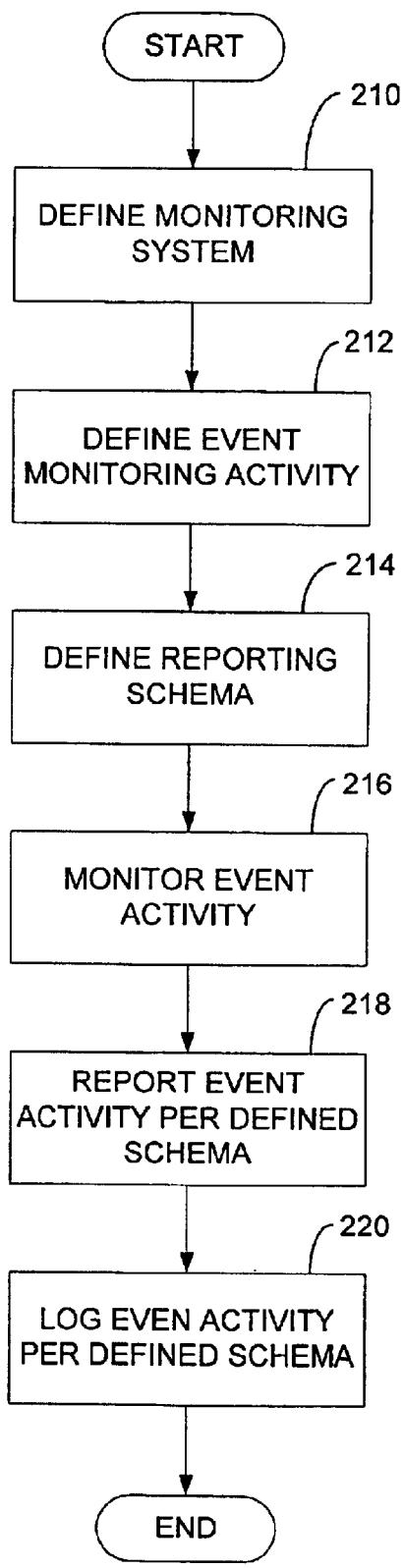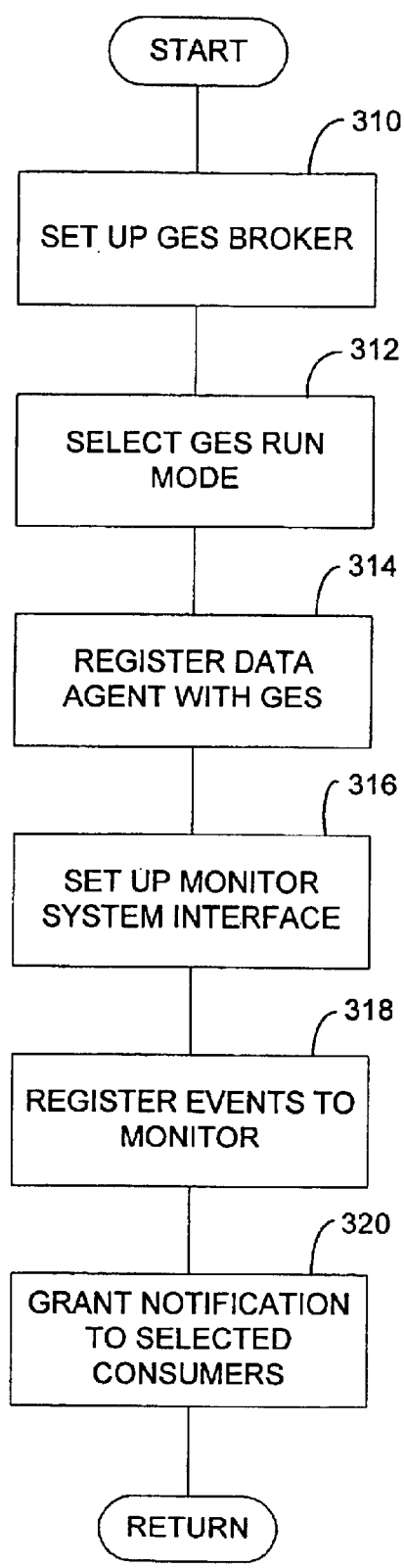
FIG._2
FIG._3

FIG_6

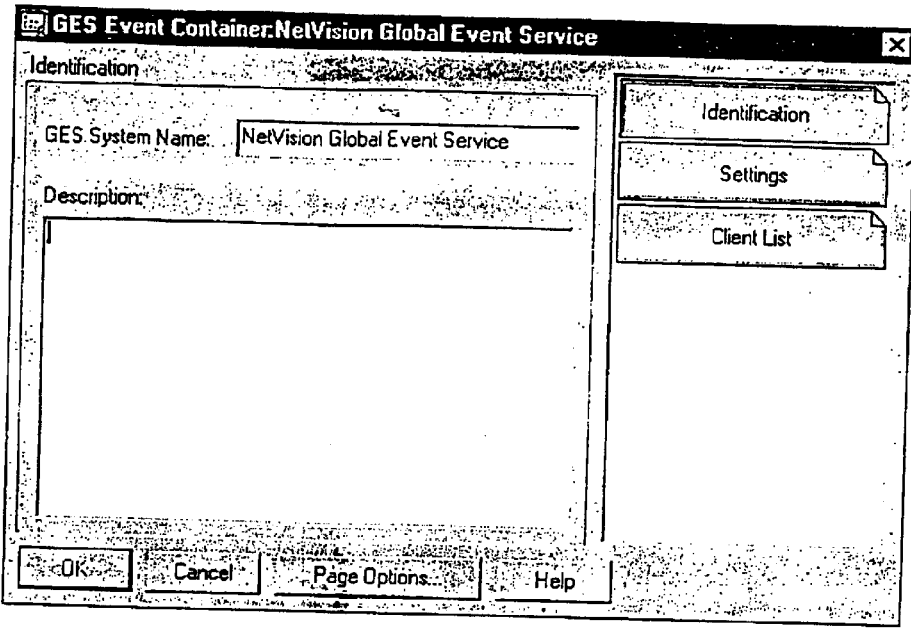
FIG. — 8
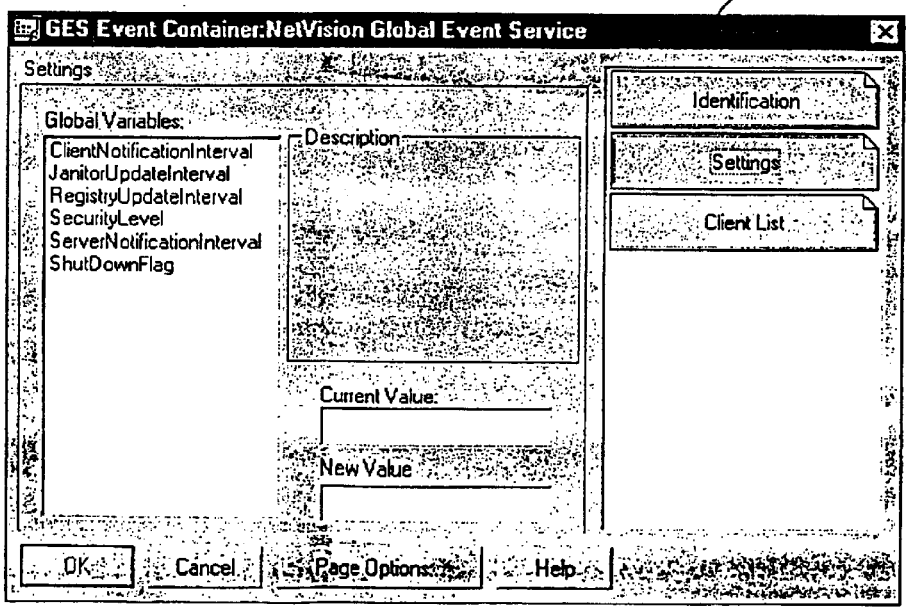
FIG. — 9

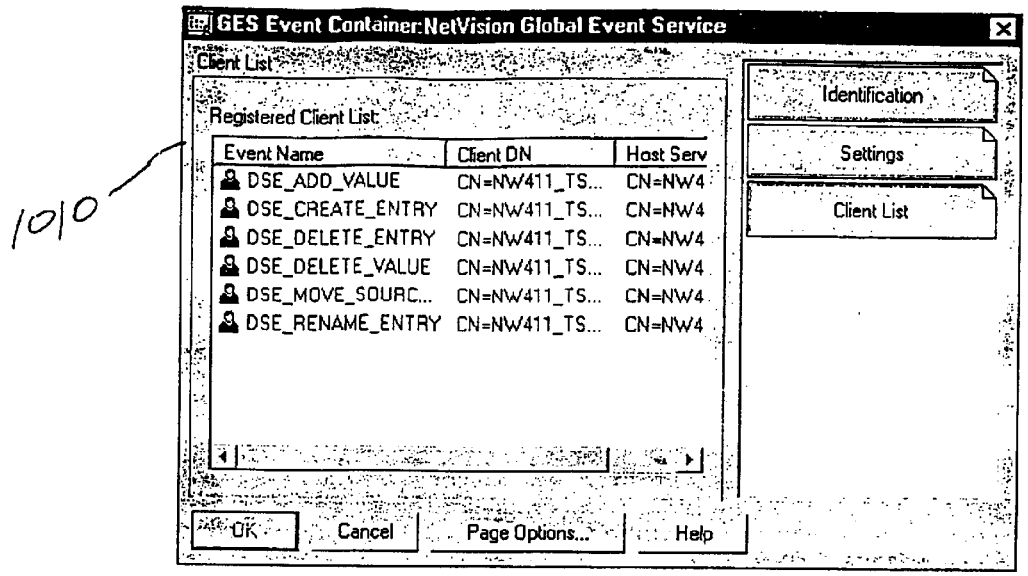
FIG._10
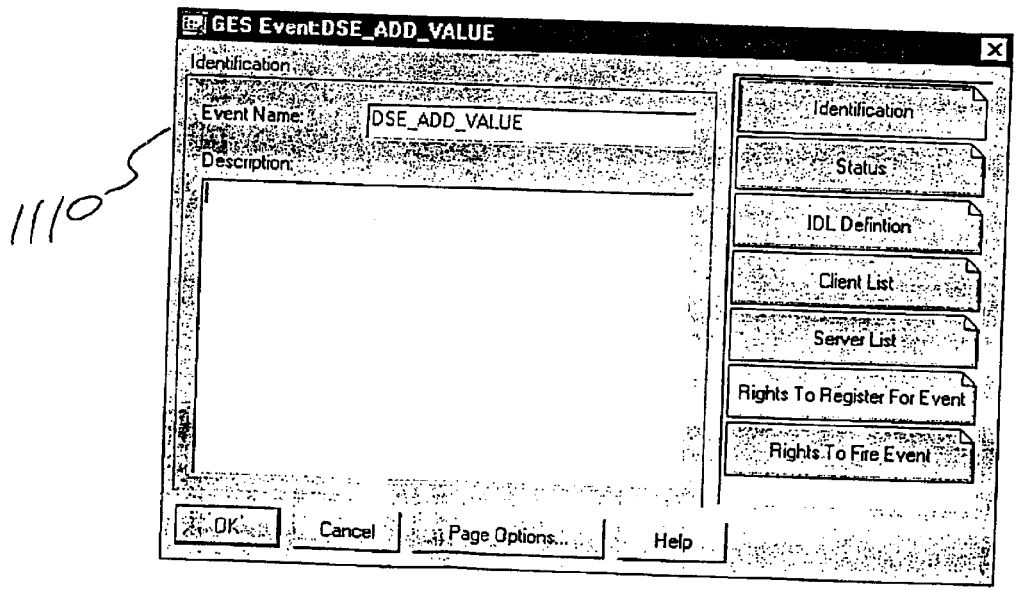
FIG. 11

METHOD AND SYSTEM FOR INTELLIGENT GLOBAL EVENT NOTIFICATION AND CONTROL WITHIN A DISTRIBUTED COMPUTING ENVIRONMENT

BACKGROUND OF THE INVENTION

This invention relates generally to event notification and distribution within a distributed computing environment and, more specifically, to a global event notification system and method for notifying an administrator, user, auditor, or other recipient(s) of changes affected within the distributed computing environment.

Distributed computing environments are typically made up of several systems and resources. For example, Local Area Networks (LAN), Wide Area Networks (WAN), and other types of computer networks typically involve many computer systems connected together via physical communication links. Many networks comprise two or more interconnected servers. User or client systems then attach to one or more of these servers. In addition, servers may have attached peripherals that are available to users of the network. For example, many office networks have various devices that are available to all users of the network, such as printers, fax machines, modems, and the like.

In order to share information and resources among the various systems in a computer network, systems must be able to discover the status of other systems or devices in the network. For example, when a file is to be printed by a network printer, the file must be transferred to the server that is responsible for printing; typically the server physically attached to the printer. Before such a transfer takes place, it may be desirable to discover or ascertain the status of the network printer. For example, if the network printer is off-line or otherwise unavailable, there would be little benefit to transferring a file to the printer for printing. As another example, after a file is finished printing, it may also be desirable to inform the user that the print job is completed. Thus, in a distributed computing environment there is a need for systems to be able to discover when certain events happen on other systems. Although such a mechanism was once accomplished by polling (requesting the status of other systems), today's modem architectures utilize an event notification procedure.

In an event notification procedure, when an event occurs that should be known by other systems, the system where the event occurs sends a message to the other systems to notify them of the event. This notification can be called "event notification" and is typically accompanied by a message packet containing data associated with the event. In a computer network, systems or processes that produce events can be referred to as "event producers" and systems or processes that should be notified of the event can be called "event consumers."

When an event consumer receives notification that a certain event happened on an event producer, the event consumer can take appropriate action. In the case of one example given above, if the network was set up to notify a user when a file had finished printing, after the file had been printed, the server responsible for printing the file would generate an event notification that printing had finished. This event notification would then be passed to the user to notify the user that printing had concluded.

By its very nature, event notification is a local phenomenon. In other words, an event producer notifies event consumers of events that happen locally to the event producer. Event consumers that desire to receive notification of certain events "register" with the event producing system. When an event occurs, notification is sent to all registered event consumers.

Experience has shown that as networks grow to hundreds, thousands, or tens of thousands of systems and users, the size of such a database becomes larger than any one system can store and maintain. In such a situation, the database is often broken up and scattered among various servers in the network. Thus, server A may contain part 1 of the database, server B may contain part 2 of the database, and server C may contain part 3 of the database.

Sometimes, in order to provide redundancy and prevent loss of the database, portions of the database are replicated on different systems. For example, server A may contain parts 1 and 3 of the database. Server B may contain parts 2 and 1 of the database, and server C may contain parts 3 and 2 of the database. In such a configuration, if any single system is lost, the remaining systems still have an entire copy of the database.

While breaking the database up among systems helps to provide robustness and eliminates the problem of having a single database on one system, it also creates several problems for event notification systems. Because event notification is a local phenomenon, if an event consumer wishes to be notified when a user is added to the system, the event consumer must be registered with enough servers to ensure connections to all parts of the database. This is because if the event consumer only registers with Server A, then in the example given above, the event consumer will only be notified if parts 1 and 3 are changed. If, in this example, part 2 of the database were changed, then an event would not be generated by Server A and the event consumer would not be notified. Prior art systems therefore require registration with a plurality of servers in order to effect notification if any portion of the database is changed. This results in multiple or redundant notifications for a single event.

Once event notification has been implemented within a distributed computing environment, there are changes that do occur within the environment that need to be brought to the attention of the system administrator. The system administrator is someone who has full rights and control over the distributed computer environment, or for at least a portion of that environment say, for example, at a remote site of a branch office of a particular corporation. The system administrator, at either location, must be informed of changes that occur within the system at an earliest convenience. For example, when passwords are being changed that allows a particular user to gain entry into the computer system, the administrator needs to know of such changes to confirm whether the change is acceptable or is being performed by an un-authorized user. This provides a level of security for the system to advise the administrator when such a change has occurred. Further, if the change is made by an unauthorized user, naturally the administrator knowledge of this change can prevent or minimize any breach to the system, thus protecting sensitive information and data stored therein.

As such, there is a need in a global event notification system operated within a distributed computer environment to provide such notification of these type of events, e.g. changes to passwords, access at a remote terminal by an unauthorized user, or other security breach, to the attention of the system administrator for appropriate action.

SUMMARY OF THE INVENTION

According to the present invention, a distributed computer environment (DCE) is disclosed that provides event globalizing of at least one event at one server in the DCE to other servers within said DCE as well as maintains a record of specific event activity over the DCE. The maintenance of the records is performed by storing a global event repository comprising a list of events and a corresponding list of servers in order to identify which of the servers should receive which events, storing a local event registry comprising a list of events- and a corresponding list of local event consumers in order to identify which of the local event consumers should receive which events, identifying specific events within the list of events to be monitored for a specific purpose, monitoring said specific events as they occur over the DCE, notifying a specific local event consumer of the occurrence of the specific events, and recording a log of event activity involving only the specific events.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which:

FIG. 1 is a schematic diagram of a monitoring and notification system in accordance with the present invention;

FIG. 2 is a block diagram of the method steps implemented by the monitoring system of FIG. 1 as defined by the system administrator to perform event monitoring and notification in accordance with the present invention;

FIG. 3 is a block diagram illustrating the steps implemented by a user in establishing which events are to be monitored and which consumers are to receive notification of those monitored events in accordance with the present invention;

FIG. 6 illustrates a graphical user interface image of a window defining the details of an object to be monitored and reported in accordance with the present invention;

FIG. 8 illustrates a graphical user interface image of a window defining an identification setting of the event container of FIG. 7 in accordance with the present invention;

FIG. 9 illustrates a graphical user interface image of a window defining the settings of an event container in accordance with the present invention;

FIG. 10 illustrates a client list of registered clients in a GUI window in accordance with the present invention;

FIG. 11 illustrates a graphical user interface image of a window defining the identification of an event in accordance with the present invention;

DETAILED DESCRIPTION OF SPECIFIC EMBODIMENTS OF THE INVENTION

Figures 4, 5:
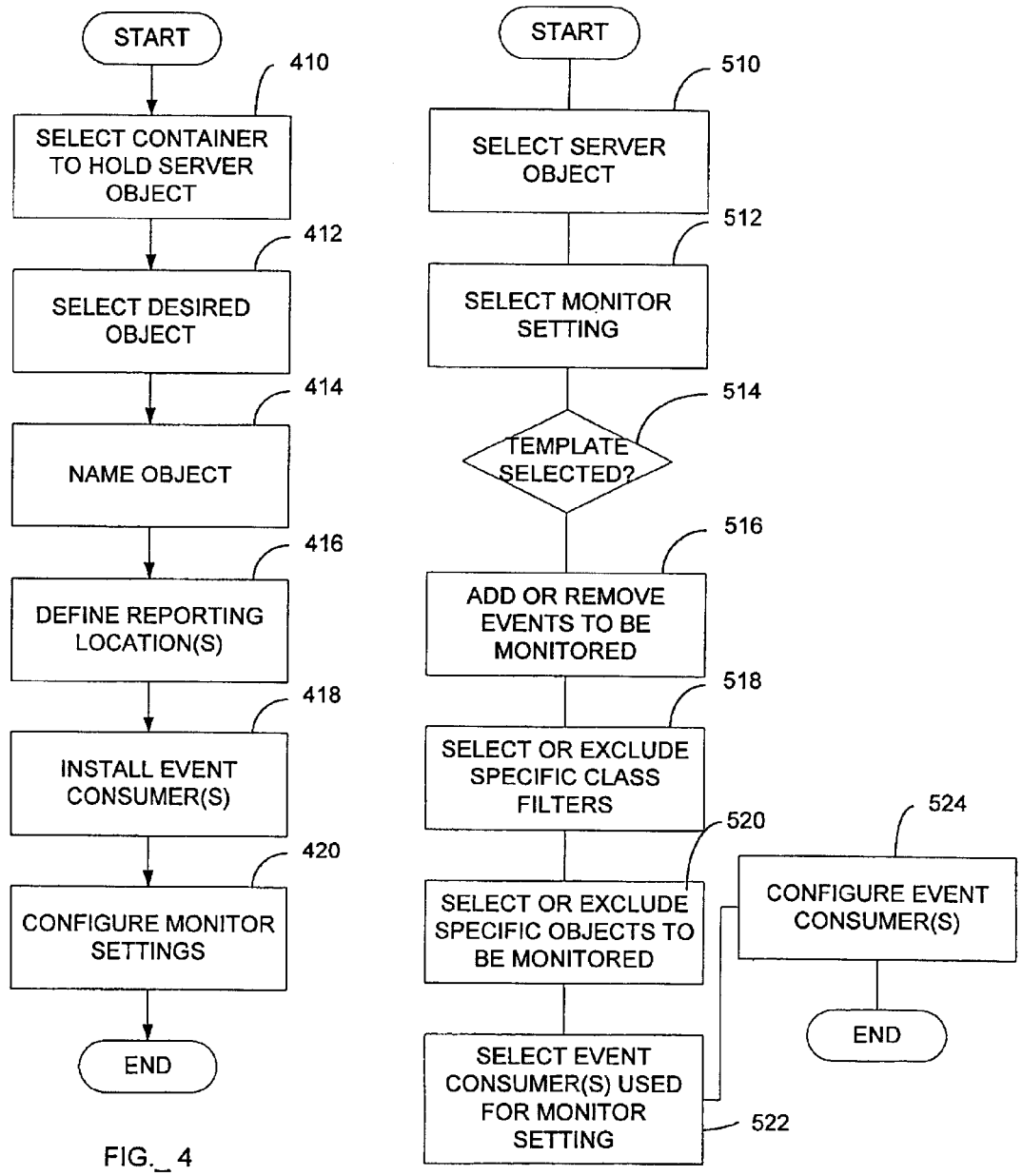
FIG. 4 is a flow diagram of the steps implemented in defining and installing objects to be monitored.
FIG. 5 illustrates a flow diagram of the method steps for defining objects and monitoring settings, as well as filter definitions, in accordance with the present invention.

The present invention discloses a system and method for observing objects and events and providing notification of these observed objects and events within a distributed computer environment (DCE). One example of a suitable environment in which the present invention operates is described in detail in U.S. Pat. No. 5,721,825, issued Feb. 24, 1998, commonly assigned herewith, and incorporated by reference for all purposes.

The following description of the present invention is described by using flow diagrams and data flow diagrams to either describe the structure or the processing of at least one embodiment implementing the systems and methods of the present invention. Using the diagrams in this manner to present the invention should not be construed as limiting of its scope. The present invention contemplates both systems and methods for global event notification and delivery. The disclosed embodiment of a system for global event observation and notification comprises a general-purpose computer. The present invention, however, can also be used with any special purpose computer or other hardware system and all should be included within its scope.

One type of general purpose computer comprises traditional computer elements such as display means for displaying information to a user, a CPU means or other processing means for processing program code means, program storage means for storing program code means executed by the CPU or other processing means, and input means for receiving input from a user. Additionally, computers having no local program storage means and that receive program code means across a communication link should also be included within the scope of the present invention.

Embodiments within the scope of the present invention also include articles of manufacture comprising program storage means having encoded therein program code means for causing a CPU to perform certain actions. Such program storage means can be any available media that can be accessed by the processing means of a general purpose or special purpose computer. By way of example, and not limitation, such program storage means can comprise RAM, ROM, EEPROM, CD-ROM or other optical disk storage, magnetic disk storage or other magnetic storage devices, or any other medium which can be used to store the desired program code means and which can be accessed by a general purpose or special purpose computer. Combinations of the above or other program storage means should also be included in the scope of program storage means.

Program code means comprises, for example, executable instructions and data that cause a general purpose computer or special purpose computer to perform a certain function or a group of functions.

The present invention utilizes the global event notification system and method described within U.S. Pat. No. 5,721,825 to define local event consumers registered with a local event registry for notification of when given events occur. The typical event occurring within the present invention is that of a defined change to the system, for example, a passwords change, a user accessing a remote system not previously authorized, and the like. The invention further provides a procedure for preparing a report of the change activity with a detailed accounting of when, where, what change occurred, what the prior state was, as well as other information that is useful to monitor and evaluate such changes for security purposes.

FIG. 1 depicts a schematic diagram of a distributed computer environment (DCE) 10 that incorporates the object and event monitoring and notification system of the present invention. Within DCE 10 is a directory 12, which is used as a repository for information. This information includes such items as data files, text files, graphic files, user profiles, user passwords, system programs, network management programs, and other files of general use typically found within a networked computer system. Although only a single directory 12 is shown within DCE 10, a plurality of directories (not shown) can also be incorporated as part of DCE 10. Directory 12 is in communication with a global event service (GES) controller/broker 14, which serves as a communications, object, and event management controller or broker. GES controller 14 manages or brokers the global management-activities such as viewing global event services, as well as making assignments, defining events, and granting rights to these global event services. Further, the GES controller 14 allows the system administrator to perform server management, configuration, and monitoring of each global event service system (all local) in communication with the server on which it is loaded. For example, a second GES controller 14 is shown, which manages its own local server that may be in communication with directory 12 via a DirectoryAlert (DA) controller 16. Of note, the system administrator can be extended to include other authorized entities such as system auditors, users, or other support staff, where needed.

GES controller 14 has configurable options that include connection time outs, log file sizes, memory usage settings, and other items that typically are set on a per server basis. GES controller 14 also has global configurable options that include security policies, communications, management functions, and other items that are typically set on a system level thereby configuring the entire DCE 10. DA controller 16 provides a directory object management system that monitors directory and directory object activity within DCE 10. The directory activity can be unrelated to directory objects such as, but not limited to, directory schema changes, directory communications, and directory health. The directory object activity can include any and all objects within the directory without limit to object class, attribute, location or any other "feature" of the object. Examples of directory object activities are, but not limited to, detecting user account changes, password changes, privilege, rights, or access changes whether directly or indirectly granted (indirect grantings examples can include group memberships or inherited rights from parent objects), container objects, Root objects (rights for whole directory), servers, and printers DA controller 16 then reports this activity to specific event consumers, which are customizable. DA controller 16 gives a system administrator, or other authorized entity such as a system auditor, user, or support staff, the ability to manage security, ensure network integrity, and track policy noncompliance in a time efficient manner.

A system administrator may configure DA controller 16 to transparently monitor network directory objects for unusual or suspicious activity and report that activity information. For example, DA controller 16 can detect when a user object with administrator rights has been deleted and send the administrator an email message alert.

DA controller 16 further provides reporting of the monitored activity, with the reports being sent to various outputs, including log files, DSC objects, a database, and e-mail messages. An event consumer report, as contemplated within the present invention, typically contains such information for the event activity as the time stamp, event source type, event source name, setting name, event name, Distinguished Name (DN), class name, perpetrator, originating server, attribute name, attribute value, and objects. At one place in which the consumer event reported is stored, is in file system 18.

Each GES controller 14 is designed to operate or run in one of three modes The first mode requires that the GES controller 14 run on every server within DCE 10, the server that has a read/write replica of any partition to be monitored. This provides real time monitoring regardless of which replica was changed. The second mode requires that the GES controller 14 run on at least one server that contains replicas of all partitions to be monitored. The third mode monitors a selected, isolated portion of a network tree, which does not communicate with other GES service brokers (if supported by directory implementation).

DA controller 16 registers with at least one GES controller 14 so that whenever monitored changes are made within DCE 10 that apply to a tree in which the agent is running, GES controller 14 will notify the agent of the DCS event through DA controller 16. The agent then reports the same event through the definable event consumer. Typically, the system administrator defines multiple monitor settings or rules, each acting on different events within a defined tree of DCE 10.

In the example of FIG. 1, there are three "trees" that are serviced by DA controller 16. Tree is also synonymous with a single directory hierarchy, ideas-hierarchy, branch, and thread. The first tree begins with a monitor setting registration list 20A, which couples to a filter 22A. The second tree includes monitor setting registration list 20B, which is coupled to a second filter 22B. Lastly, a third monitor setting registration list 20C is provided, which is coupled to a third filter 22C. Each filter 22 is independently programmed and defined in accordance with criteria desired by the system administrator. This filtering mechanism is described in greater detail below. Each filter 22 further couples to an event consumer server (ECS) 26. Additional trees can also be added to DCE 10 using the same procedures outlined for building any one tree illustrated in the present invention. ECS 26 is an intelligent dispatching and brokering system that receives events from DA 16 after it has met requirements set by Monitor Settings 20 and Filters 22. It then negotiates the management of each event with each event consumer assigned and configured to the Monitor Setting(s) to which this event is associated. Once the system administrator defines the events to be monitored and the event consumers to report which events have occurred, the changes are implemented within DSC 10. The monitor settings, as found in each of registration lists 20A, 20B, 20C are used to test events that are passed form the GES controller 14 to DA controller 16 to see if they conform with any configured monitor settings found in registration list 20A, 20B, 20C. ECS 24 is further communicatively coupled to at least one event consumer 28. Once an event meets the criteria of any of the configured monitor settings, a specific event consumer 28A-G, as specified by the defined monitor settings, reports the event activity in an appropriate manner. Once EC 28 receives an event activity for reporting, it is forwarded through an associated filter 22, which includes further refinement for selecting which final event consumer is to receive the report of the event activity and in what form such a report is generated. For example, where registration list 20A has been determined to cover a particular event activity, that information is forwarded to EC1 28A and EC2 28B. EC1 28A, in this example, provides a report being sent to a database 30. EC2 28B reports the event activity in the form of a text file 32. For registration list 20B, there are three event consumers associated with this tree in this example. These event consumers include 28C, 28D, and 28E. For event consumer 28C, the activity event is reported as an e-mail 34. For event consumer 28D, the event activity is reported to database 30. And for event consumer 28E the activity event is reported as a data file 32.

Lastly, for the example covering registration list 20C, there are two event consumer activities, which include EC 28F and EC 28G. They are further distinguished as EC1 and EC2, but they do cover the same activity event for reporting purposes. For EC 28F, the event is reported in a text file 32, which is likewise performed by EC 28G to another text file 32. In this example, EC 28G further performs a reporting of the activity event back to directory 12. This has been provided by the definitions found in associated filter 22.

ECS 24 operates upon a set of rules that have been incorporated therein as rule set 26. Rule set 26 serves as a rules parser and provides for custom logic to be placed within DCE 10 with respect to the data alert feature of the present invention. The rules provide a level of intelligence that allows DA controller 16 to interface with these rules. The use of the rules support queries of any and all directory objects to expand the filter mechanism found within each filter 22. The filters are provided additional or new information not necessarily contained within an event notification transmitted throughout DCE 10 to enable proper delivery of the event or object to its intended destination event consumer. DA controller 16 is further able to interface with the rules to support modification of any and all objects and any and all attributes. This extends the proactive intelligence nature of DA controller 16. For example, if a particular user, Jsmith, granted access rights to another employee, contrary to company policy, then the modification provided by DA controller 16 would allow the system to revoke the rights just granted, disable JSmith's account, and notify the system administrator, or alternative supervisors or administrators, of this particular event activity. In this case, company policy information is not necessarily contained within the rights access event, pro-active procedures were executed thereby reversing or changing the directory to enforce the rules comprising company policy, notification of event to administrator was conditional upon status of event and/or implementation of rule.

Figure 7:
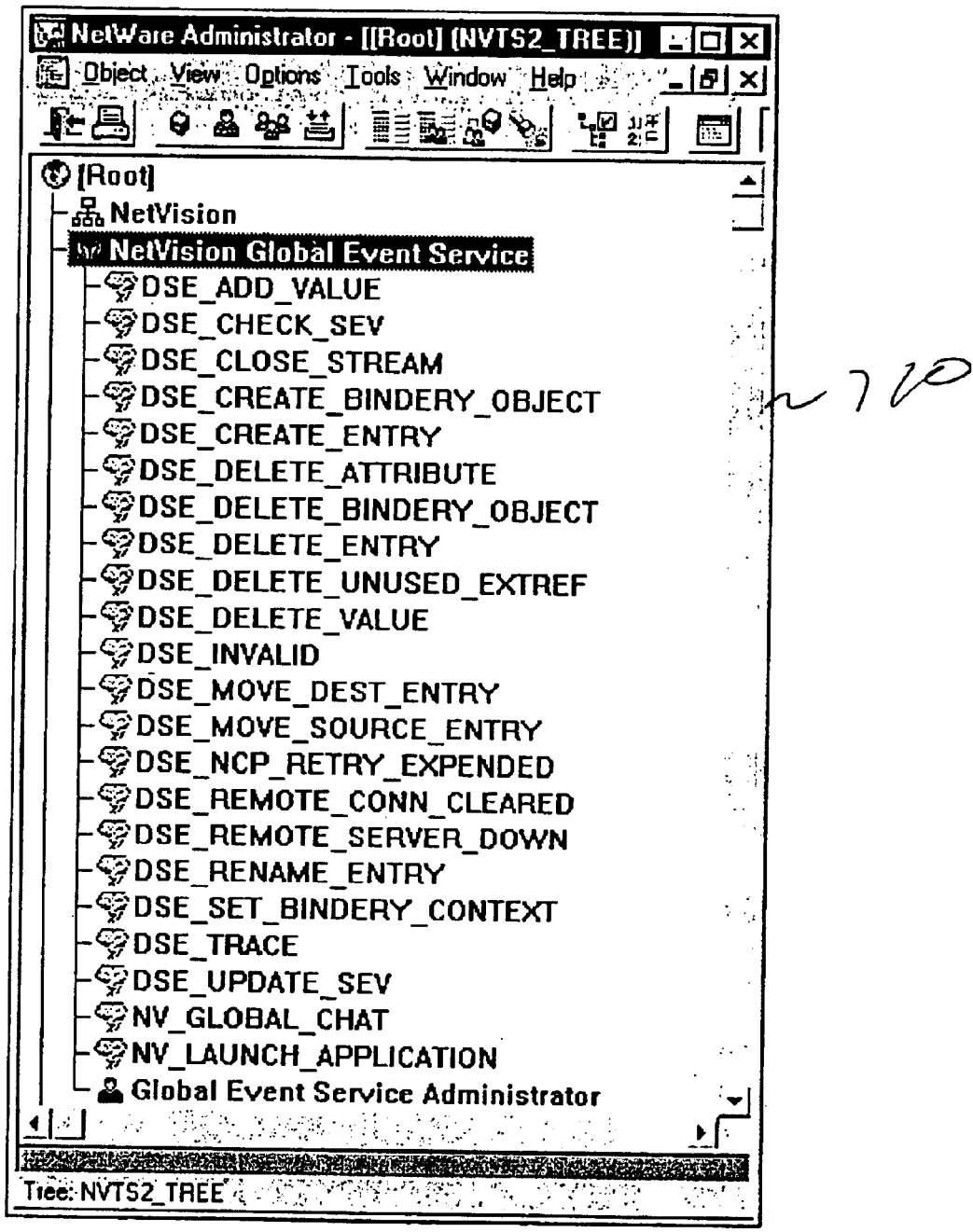
FIG. 7 illustrates a graphical user interface image of a window defining a GES container of events used for specific notification, general broadcast, or specialized communications in accordance with the present invention as elected by the system administrator.

Each GES controller 14 includes a global event service container that is subordinate to the root directory within the DCE tree. FIG. 7 illustrates a graphical user interface image of a global event services container 710 as contemplated within one embodiment of the present invention. GES container 710 holds all event types used by GES controller 14. A partial list of these objects include: add value, check server, dose stream, create bindery object, create new entry, delete attribute, delete bindery object, delete entry, delete unused external reference, delete value, invalid, move destination entry, move source entry, end CP retry expended, remote connection cleared, remote server down, rename entry, set bindery context, trace, update server. Further included within container 710 are applications, such as global check and launch application, as well as a global event service administrator.

GES controller 14 fully adheres to any directory architecture and implementation. It is likely, but not required, that in order to receive directory events, operate within the directory mechanisms and services, and to proactively and intelligently query and/or modify the directory, an entity within the directory must be created and configured to be able to perform these functions. The example shown in Global Event Services Container 7, object Global Event Service Administrator, is created and granted rights for these actions. GES controller 14 provides a service or set of services that login and authenticate to directory as this Global Event Service Administrator thereby obtaining rights and permissions via proxy. In this example, the directory administrator can fully control the authentication and privileges assigned to GES controller 14 in a manner that is consistent and intuitive with the particular behavior and tools of the directory. Further, this prevents access to events by any other non-administrative or unauthorized object.

In one specific embodiment, GES controller 14 is implemented in a Novell Directory Services Events (DSE) notification system, which is compatible with Netware working procedures, programs, and applications. The events that are utilized within a Netware compatible system begin with "DSE." The DSE events allow specific changes within NDS to be sent to remote applications. Some DSE events report internal NDS activity, which is useful for observing NDS behavior and monitoring network performance. In this embodiment, only NDS can fire DSE events. This ensures no security violations via proxy. A commercially available product that implements the monitoring, notification, and updating system in accordance with the present invention is found in DirectoryAlert 2.0, sold by NetVision, Inc. of Orem, Utah.

In alternative embodiments, GES controller 14 is configured to operate within other notification systems, such as, for example, Lotus Notes, Microsoft Exchange, Windows NT, and other e-mail, corroboration, or notification systems known to those skilled in the art. These include such notification systems as generally internet-related systems such as Netscape Navigator, Microsoft Explorer, as weil as other known web browswers, telephony systems, telecommunications systems, and commercial databases such as Oracle, Sybase, SQL Server, IBM DB2, and general database connectivity ODBC.

The present invention provides a method and system for providing notification in security type events to the appropriate administrator for handling and review. In order to provide such notification, the system must be able to monitor the event activity occurring within DCE 10. In order to monitor this level of activity, each GES controller 14 is programmed to monitor the appropriate activities desired by the system administrator. First, however, an overview of how DCE 10 performs its monitoring and notification operations is provided; following which, details of how the programming, filtering, and report generation steps will be presented.

FIG. 2 illustrates a flow diagram of how DCE 10 is able to perform the monitoring and notification functions. Beginning in block 210, the monitoring activity must be properly defined, which includes defining those events to be monitored in accordance with the present invention. The system administrator, also known as the administrative user, defines the monitoring system. The procedure of defining the monitoring system includes defining a collection of event activities the administrator desires to monitor. This collection of event activities may be based on a predefined template, which is customizable by the administrator. For each monitor setting created by the administrator, the administrator specifies the events, classes, and attributes to monitor, as well as the NDS context, and the objects to monitor. Accordingly, the administrator defines the event activity to be monitored as shown in block 212. Next, in block 214, the administrator defines the reporting scheme to be utilized. This includes reporting the event activities by configuring event consumers to send event activity information to different report locations, such as file logs, E-mail, or other data base locations, or to any selected NDS object. Next, the system performs the actual event activity monitoring authorization as shown in block 216. Once an event activity qualifies within the monitoring schema, the system reports the event activity per the defined schema in accordance with block 218. Next, in block 220, the system logs the event activity as previously stated. One embodiment of rules 26 is as follows. Within the creation or configuration of a monitor setting, the filters are defined, the event consumers are selected and configured, and the rules are defined within rules 26.

The discussion with respect to FIG. 2 provides an overview of how the monitoring and notification system operates in accordance with the present invention. One of the essential steps is to provide monitor settings to define which events and what type of activity is to be monitored. FIG. 3 illustrates a flow diagram of the steps incorporated in establishing particular monitor settings in accordance with the present invention. Beginning in block 310, the user sets up a GES broker or GES controller 14. The system administrator selects the particular GES controller 14 to be defined as well as what events will be monitored by this GES controller. Next, in block 312, the administrator selects the GES run mode. There are three modes that include Mode 1, Mode 2, and Mode 3, which have bee previously defined. Next, in block 314, the administrator registers DA controller 16 with the appropriate GES controller 14. This registration provides that at any time monitored changes are made within DCE that apply to the tree DA controller 16 is running in, GES controller 14 will notify DA controller 16 of the DCE event. DA controller 16 then reports the same event through the definable event consumer.

GES controller 14 extends DCE 10 to provide a global event system that is able to monitor any change to DCE 10 across an entire network. GES controller 14 is able to detect any change anywhere in a global network and report the changes to DA controller 16 in real time.

Next, in block 316, the administrator sets up a monitor system interface. The monitor system interfaces are represented in monitor setting registration list 20A, 20B, and 20C. The registration list identifies events to be monitored in the system. This includes the specification of filter criteria. This enables events to be identified or categorized by things such as, but not limited to, directory object class, name, location, attribute name, attribute value, or any other relationship (within the directory or external to the directory) thus allowing specific events or categorical events to be described by 20, 22 and 26. One embodiment might proceed as follows: 1) a new monitor setting 20 is created, 2) directory object modifcation event is selected 20, 3) class User is selected as a filter criteria 22, 4) directory attribute "Group Membership" is exclusively selected22, 5) a rule is defined equivalent to "If 'Selected Object' (user that had a group membership change) was added as a member to "SalesGroup" then grant rights to 'Selected User' to SalesPrinter device and SalesBuildingSecurityAccess, and 6) selected E-Mail event consumer for notification with standard information. This example will grant rights to the printer for the sales department and sales building access to each directory user that becomes a member of the 'SalesGroup'.

Once the monitor system interface has been established, the system proceeds to block 318 where the system administrator begins registering events to monitor. At the time of event registration, the system administrator also specifies the event consumers to use to report those events that have occurred. Once the monitor settings have been completed, DA controller 16 then registers, as shown in block 320, to receive notification of the events via GES controller 14. This grants notification to selected consumers by testing the events against any configured monitor setting, as found in monitor setting registration lists 20A–C, for when a registered event occurs. Once an event meets the criteria for any configured monitor setting, the event consumers, as specified for that monitor setting, report the event activity. The steps of registering events for monitoring (block 318) and to grant notification to selected consumers (block 320) are illustrated in greater detail in the flow diagram of FIG. 4.

FIG. 4 represents a flow diagram of the method utilized in accordance with the present invention to create server objects that are utilized to define the monitor settings desired by the administrator for generating the event reports as well as reporting the event activity to the appropriate event consumer. In block 410, the administrator selects a desired container to hold the specific server object to be defined and established. The container can be the root directory, or any other directory desired by the administrator for storing the server object. Next, in block 412, the administrator selects the desired object found within the selected container. If no server object is found within the container desired by the administrator, a new server object may be defined and will be described in greater detail below. Next, in block 414, the administrator specifies a name for the server object and then proceeds to block 416. In order for the DA controller 16 to monitor event activity within the appropriate DCE tree, the server object must be configured in the manner provided in blocks 416–420.

In block 416, the administrator defines the reporting location(s) to which DA 16 and all event consumers 28 report system messages. These report messages are notifications, usually about the conditions within DCE 10. This is a separate, although potentially similar, mechanism used by ECS 24 to communicate with event consumers. The reporting performed from the result of 416 might include, but not be limited to, "Information: DirectoryAlert Service as successfully started", "Error: DirectoryAlert was unable to communicated with the directory", or "Warning: Email event consumer has reported that the email subsystem is temporarily offline."

Monitor settings are defined to generate collections of event activities desired to be monitored. The administrator typically bases the monitored settings on predefined templates that are customizable. Each monitor setting is built by specifying events, classes, and attributes to be monitored, as well as the objects to be monitored. Further, the administrator specifies how to report the event activities by configuring the event consumers to send event activity information to different report locations, such as, for example, dialogs, DCE objects, e-mail messages, or to a database for storage, or any combination of these report locations. FIG. 5 illustrates a flow diagram of how the monitor settings are defined. Beginning in block 510, the administrator selects a server object. In the selection of the monitor setting, the administrator also provides a name for this particular setting and, if desired, a description is added for reference and identification of the particular monitor setting for editing or indexing purposes, which are part of the step of selecting a particular monitor setting shown in block 512. Next, in block 514, the administrator selects a particular monitor template, if desired, and then proceed to block 516.

Starting in block 516, the administrator customizes the registration of the particular monitor setting. For example, the administrator can add or remove events to be monitored. Next, in block 518, the administrator selects or excludes specific class filters, as needed. Once the class filters have been selected, the administrator proceeds to block 520 to select or exclude specific objects to be monitored, as needed. In the filter selection step of block 518, the user also can select or exclude specific attribute filters, as needed. By system default, events are monitored for all objects in the tree that pertains to the class type defined. For example, if the class is "User," only user objects will be monitored. At this time, the administrator is able to specify the starting context monitoring in order to include a particular sub tree. For example, if there was a sales organization container and it had two organizational units ("internal" and "external"), then the entire sales organization (subtree) can easily be monitored including any newer sales organizations unknown at the time of the monitor setting creation. This would allow changes to objects within Company.Sales, Company.Sales.Internal, Company.Sales.External, or Company.Sales.Internet if this entity was created at a later time.

After the events have been added or removed to be monitored, the specific class filters, attribute filters, and objects to be monitored, have been selected or excluded, the administrator then begins to configure the selected event consumers. In block 522, the administrator selects the event consumer(s) used for the monitor setting. Once an event consumer(s) is added, the administrator then configures the selected event consumer(s) in accordance with block 524. When configuring the event consumer(s), the administrator is able to select where the event consumer reports are to be sent. By default, these event consumer reports are stored in log files labeled SYSTEM 32 within the root directory upon which system the DA controller 16 runs. Once this is completed, and all event consumers added have been properly configured, DA controller 16 can now monitor event activity in accordance with the monitor settings established by the administrator and report the particular event activities through the event consumers thus configured.

A first example of creating a monitor setting is where the administrator desires to track when user creations occur within a certain context of the tree. To do this, the administrator selects a predefined monitor template such as "User Create" that contains the Event Type "DSE_CREATE_ENTRY" and the class filter "User." Next, the administrator specifies the particular starting context. Once the context has been defined, the user adds and configures the event consumers desired to which the event activity is reported. The administrator can perform a quick check to verify that the monitor setting and event consumer reports have been properly configured by adding a new user, then checking the event consumer reports to see if the monitored event is duly reported.

In a second example, the administrator may desire to create a monitor setting for tracking membership changes for a specific group within a certain context of the tree. To do so, the administrator selects the predefined monitor template "Group Membership Changes," which contains the event types "DSE_ADD_VALUE," "DSE_DELETE_ATTRIBUTE," "DSE_DELETE_VALUE," the class filter "group" and the attribute filter "member." Next, the administrator then specifies the group to be monitored and the starting context. Once the group to be monitored and the starting context have been specified, then the administrator adds and configures each and every event consumer desired to which the event activity is reported. To check whether the monitoring has been properly defined, the administrator then performs a test by adding or removing a user as a member of the particular group, and then checking the event consumer reports to which that event activity is to be reported.

Monitor settings may be edited or deleted at any time by the administrator, or authorized user. To edit a monitor setting, the administrator selects the monitor setting object to display the detail page of the particular monitor setting to be edited. next, the administrator selects the monitor setting page and unselects the particular monitor setting by name. Once the named monitor setting is selected, then the user accesses the details section and makes the desired changes and then closes the saved changes. To remove a monitor setting, the administrator selects the name of the monitor setting as if the administrator was to perform an edit of this particular monitor setting, and deletes or removes the particular monitor setting. When a monitor setting is removed, the associated monitor setting registrations and configured event consumers for the monitor setting are also removed.

FIG. 6 illustrates a graphical user interface window of a DCE event information window that provides the "details" of a given event item. This view shows information related to the details of the particular event item in accordance with principles of the present invention. For example, a time stamp is provided within the window 610 that indicates the time and date at which the event item has been established or last edited. An event source type is provided, which in this example is an NDS event. The event source name is also provided, and for this example that name is LAB_TREE. Additionally, a setting name, event name, DN, class name, perpetrator, originating server, attribute name, and attribute value are details provided for each event item.

The setting name may be selected from one of the template setting names provided within the base program or may be defined by the administrator at the time of creation of the event item. Further, the setting name represents the brief visual display of the setting. This is a textual description selected by the user to be able to differentiate one setting from another within a list of settings.

The event name defines the name of the given event and may be taken from one of the event templates provided within the program. Otherwise, the administrator may prepare a unique event name for a particular event item. In this example, the event name is DSE_CREATE_ENTRY.

The Distinguished Name (DN) provides full contextual naming content for a directory object. The Common Name (CN) provides only partial naming of a directory object and, in the case of user accounts, is sometimes the user ID. For example, there could be two employees in a company (Company) with the name John Smith and user IDs of J. Smith. J. Smith is their CN. If one J. Smith is in the sales organization (Company.Sales) and the other is in the marketing organization (Company.Marketing) then the DNs of these two accounts would be Company.Marketing.J. Smith and Company.Sales.J. Smith thus providing a unique name within the directory.

The class name defines what class type the particular event item is. In this example, the class name is "user." The perpetrator field defines who last modified the particular detail item. Along with the perpetrator last modifying the details of the particular event item, the details field also provides for information identifying the originating server either establishing the event item or last modifying the event item.

The attribute refers to a specific data portion or component of an object whereas an attribute value refers to the actual data contained within the attribute. Following is a partial list of attributes and attribute values for a directory user object of class User:

Attribute Value

Description John Smith works is accounting

E-mail jsmith⁴⁄company.com

Phone number (801) 111-0000

Mail Stop Big A-1

Full Name John Smith

The event details are used to view event consumer reporting for objects within the directory services tree of the DCE 10. The details can be updated either by opening up the details window and making changes within the specific information int he selected log entry or details may be updated by a refresh procedure that occurs within DCE 10 that updates the list of log entries throughout the entire system.

FIG. 7 illustrates a graphical user interface image of a global event services container in accordance with the present invention. This container 710 is identified in the location field as to be defined as a netware administrator field within a root directory on which the global event service program is located. GES controller 14 utilizes container 710, which is subordinate to [ROOT] within the directory service tree of DCE 10. All event types and administrator user used by GES controller 14 (NVGES.MLN) are stored in this container 710. A plurality of objects are stored within container 710 and the details of these objects may be examined using detailed windows11. The types of objects located within container 710 have been previously described.

Selecting the GES container (CN=GES) directly below [root] enables the administrator to select this object and the details associated with the event information. The GES container has three pages of details, which are found in FIGS. 8–10. FIG. 8 illustrates a graphical user interface of the identification details. FIG. 9 is a graphical user interface depiction of the settings details. FIG. 10 is a graphical user interface image of the client list details.

The identification details window 810 shown in FIG. 8 displays the GES name and a description. The GES name is the name of the event container. The description allows an administrator to write information that may be useful to other administrators or users. The settings page 910 or FIG. 9 allows custom configuration of global GES settings. All GES controllers 14 read the global configuration settings. Local configuration settings on a per server basis may also be set.

Within settings page 910 there is a global variables block listing selected variables. These variables include client notification interval, janitor update interval, registry update interval, security level, server notice vacation interval, and shut-down, flag.

The client notification interval allows for periodic updates of client notifications. GES controller 14 stores events for the number of seconds identified by this interval. When this interval time has been reached, clients are then notified that events are waiting for delivery. When selecting this interval, one should balance idle CPU time with valuable memory required for storing events. Upon actual installation, this parameter is configured optimally in an automatic operation.

The janitor update interval specifies the number of settings between each internal check. Items such as client communication links and remote server connections are checked. If a client communication has been lost, the registry is cleaned up. If a connection to a remote server has not been used within the time specified, the connection will be closed. The server connection time out is a local configuration setting.

The registry update interval activates the process that detects changes to GES event registrations throughout the network. Once the changes to global event services are detected, the local server adds or removes monitoring for those events. This process improves server and network performance by monitoring only desired events.

The default security level uses the standard security measures and flexibility of Novell's directory services security system. There are three additional levels of security checking provided. The first level is security level one, which is a basic security level resolving the distinguished name of the client associated with this server connection only on log-in, although rights must be present for additional register requests. This level of security does not necessarily prevent a client connection (and associated DN) from being replaced by another client (friendly or hostile).

The second security level, or security level two, includes the same functionality and security levels provided in security level, in addition all clients requests are verified for authenticity. Thus, each request is checked to ensure that the user is the same as the one that was verified upon GES log-in. Security level two ensures that the client connection on this server is a logged-in and authenticated NDS connection. Each request made by the client is verified for this authentication. Requests to register, unregister, fire, and get events are first verified within NDS for proper rights. Once allowed access to the system, all events are followed are events are allowed until the user logs out of the system.

The third security level, security level three, includes all the security protection provided in level two. In addition, security level three performs an MDS rate check on each operation. This includes each "get event" request by the client. This additional security allows administrators to revoke rights within NDS and be insured clients already registered for those events will be denied any further access.

The server notification interval, which is similar tot he client notification interval, allows for pre-edit delivery of events to remote servers. GES controller 14 stores events for the number of seconds identified by this interval. When this interval time has been reached, remote servers that have requested these events on behalf of their connected clients have all available events delivered thereto. When selecting this interval, one needs to balance idle CPU time with memory requirements for storing events. This parameter is optimally configured upon installation and can also be customized by the administrator.

The shut-down flag setting (1) causes GES controller 14 to shut down across the entire DCE 10. All GES broker programs are then unloaded and all client communications with this application are abruptly terminated. This shut-down flag is intended to allow a single method t disable global event services throughout DCE 10.

The client list page 1010 shown in FIG. 10 displays all DCE users that have registered for events. Often while running a GES enabled application, several events automatically register while the user application is active. The registered client list also displays the events a user has registered for on the server to which the request has been sent.

All available event services events are stored in GES container 710 of FIG. 7. Events can be individually registered, unregistered, and fired. Access to each event can also be individually managed. GES events are types of events and do not store data associated with the occurrence of the event.

FIG. 11 illustrates a graphical user interface image of GES event identification page 1110. Identification page 1110 displays the event name and a brief description of the event. Since events can be created dynamically, their use and interpretation can evolve. When the events are generated dynamically, their generation is based on IDL definition, which is described in greater detail below.

Figure 12:
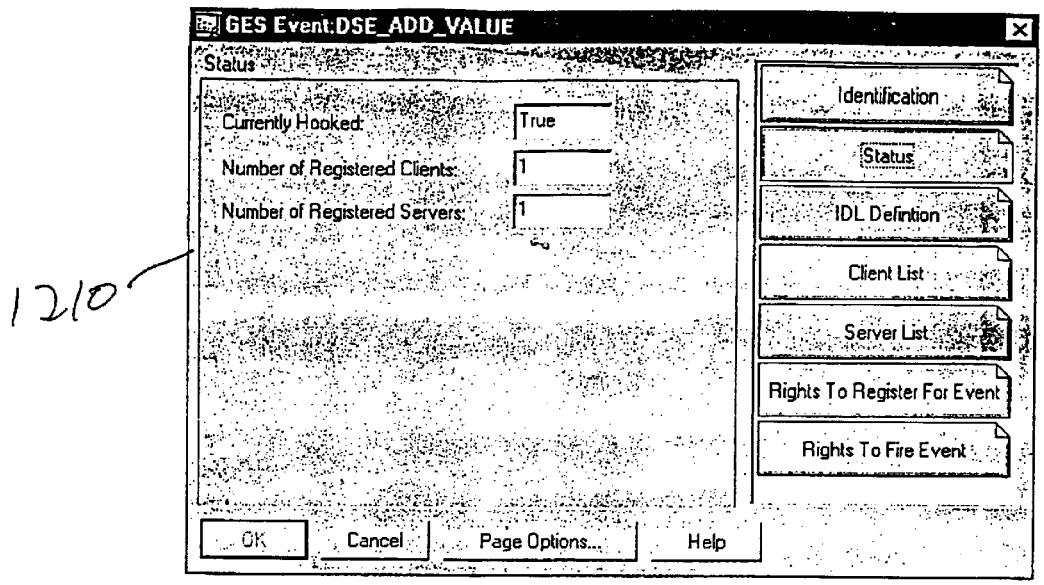
FIG. 12 illustrates a GUI window defining the status of the event of FIG. 11.

FIG. 12 illustrates a graphical user interface image of a GES event status page in accordance with the present invention. Status page 1210 identifies whether someone is currently registered for the event. If an individual is registered for the event, the currently hooked field has a true value; otherwise, the value is false. The number of registered clients identifies how many clients (users) are requesting notification of this event. The number of registered servers identifies the number of servers to which these clients are connected. Since GES events are efficiently routed to the servers connected to the clients registered fro the events, this value indicates exactly how many servers need the event.

Figure 13:
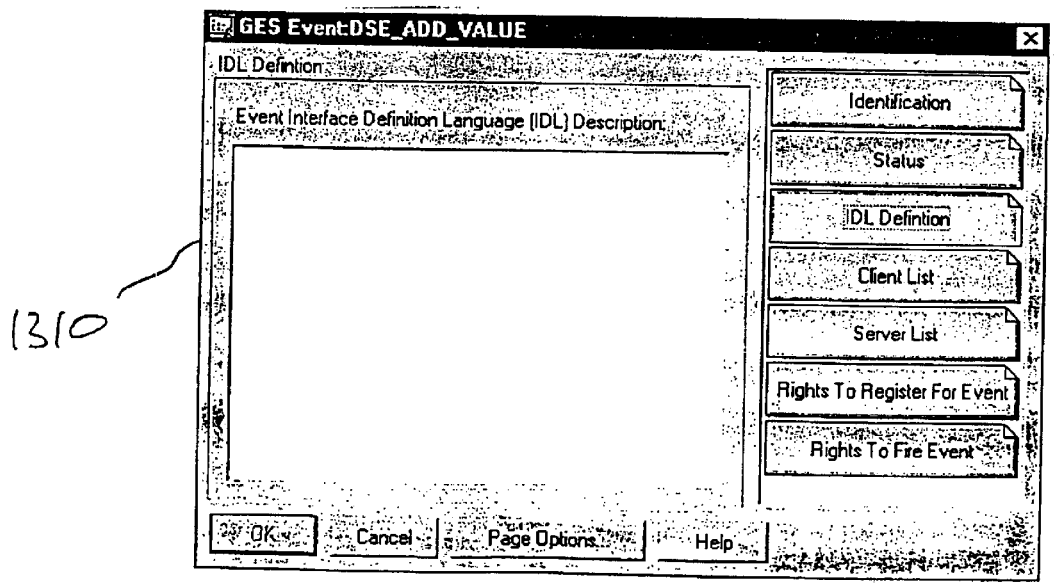
FIG. 13 illustrates a GUI window providing the IDL definition of the event of FIG. 11.

FIG. 13 illustrates a graphical user interface image of an interface description language (IDL) definition page 1310, which is available for user defined events. IDL definitions allow for custom implementation to generically define the data accompanying the event. This field is optional, but it is useful when one time interpretation of unknown events is expected. There is no restriction for the description of data types within this field. in other words, IDL is not required.

Figure 14:
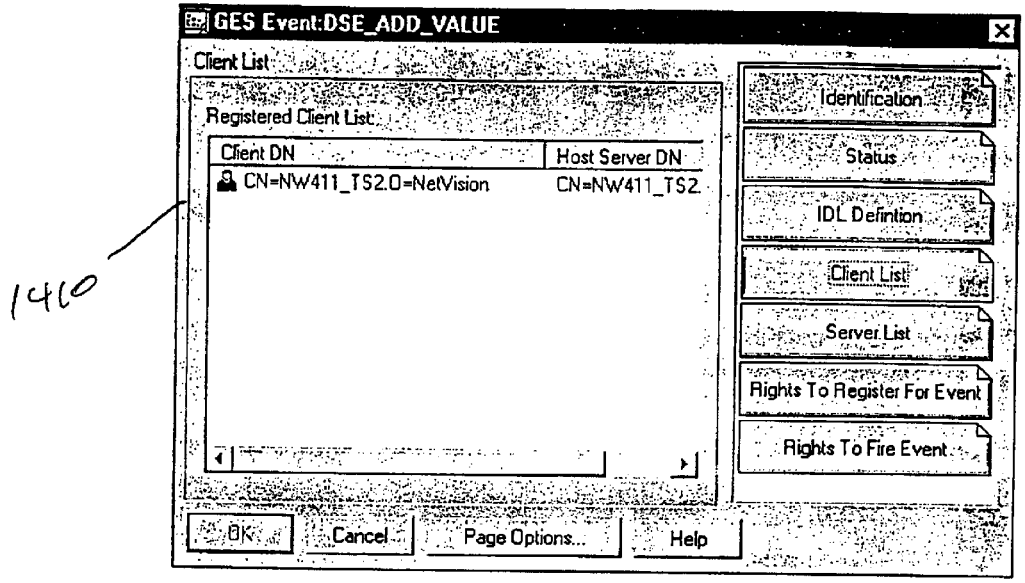
FIG. 14 illustrates a GUI window defining the client list to which the event of FIG. 11 is registered.
Figure 15:
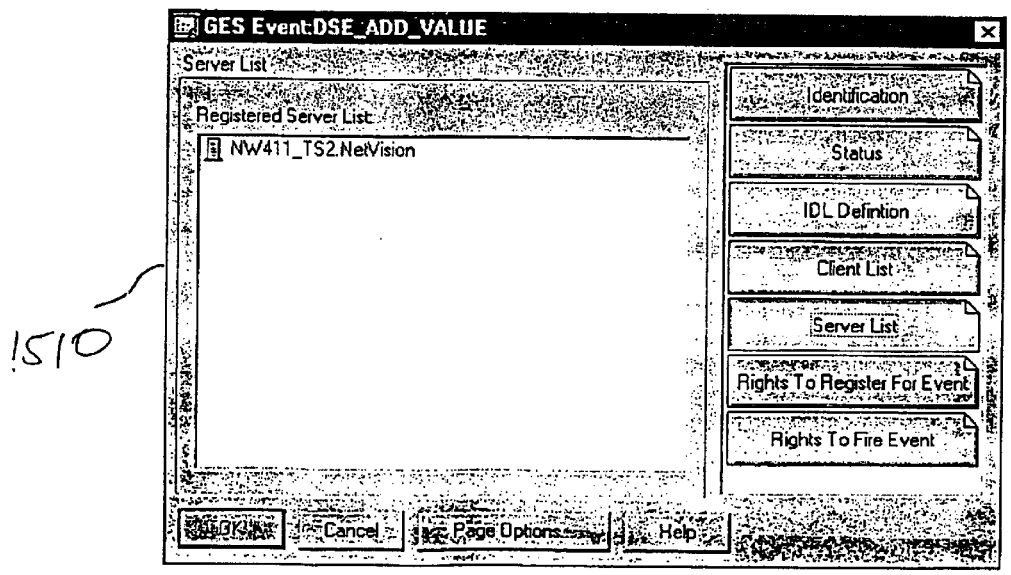
FIG. 15 illustrates a GUI window defining the registered server list to which the event of FIG. 11 is registered.

FIG. 14 illustrates a graphical user interface image of client list page 1410. Client list page 1410 identifies the NDS distinguished name of the user that has registered for this event. The host server DN is also specified. This is the DN of the server the client is attached to and from which GES requests are made. FIG. 15 illustrates a graphical user interface of a server list page 1510, which identifies the server name of all servers the clients are attached to and from which GES requests are made. All events of this type are eventually promulgated to each server in the list. The list is of all registered servers.

Figure 16:
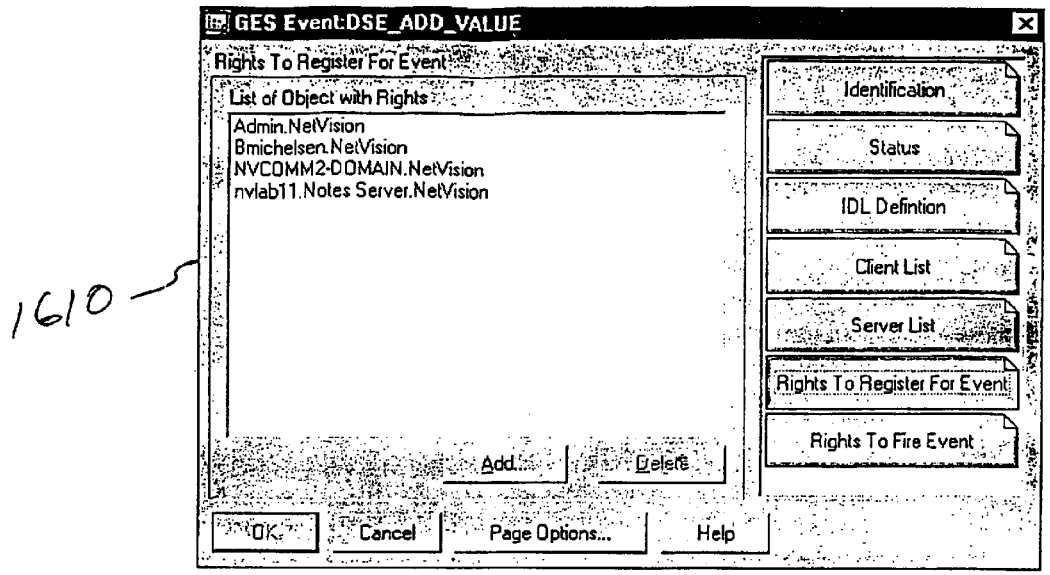
FIG. 16 illustrates a GUI window defining the object rights list for the event of FIG. 11.

FIG. 16 illustrates a graphical user interface image of rights to register for event page 1610, which lets an administrator assign rights that give other users and groups access to this event. These rights may be assigned like any other NDS right or ACL by granting write rights for a user, group, or a container to the register for event attribute of this event object. A list of object with rights is illustrated in this example.

Figure 17:
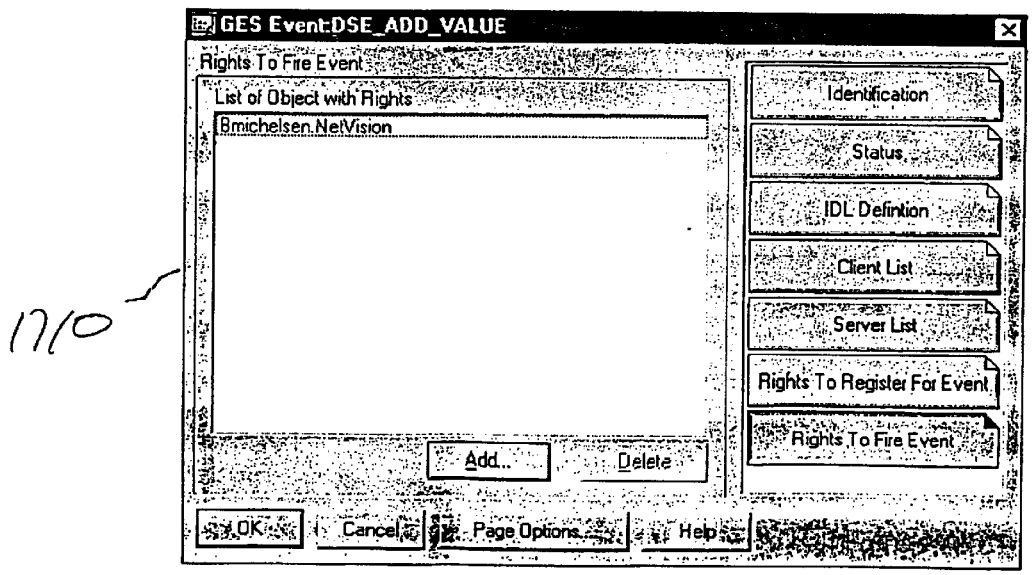
FIG. 17 illustrates a GUI window defining the list of object with rights to fire the event of FIG. 11.

FIG. 17 illustrates a graphical user interface image of rights to fire event page 1710, which lets an administrator assign rights that give other users and groups access to fire this event. Rights may be assigned like any other NDS right or ACL by granting write rights for a user, group, or container to the fire event attribute of this event object. Only custom or user defined events may be fired (triggered). Standard NDS events cannot be fired in this environment. Violating this behaviour would inappropriately identify the true authorship of an event i.e. a user or process should not be allowed to change the directory as if the directory did it. The process should be identified as the source or author of the event or behavior.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a distributed computer environment (DCE) that provides event globalizing of at least one event at one server in said DCE to other servers within said DCE, a method of maintaining a record of specific event activity over said DCE comprising:

storing a global event repository comprising a list of events and a corresponding list of servers in order to identify which of said servers should receive which events;

storing a local event registry comprising a list of events and a corresponding list of event consumers in order to identify which of said event consumers should receive which events;

defining specific types of events within the list of events that are to be monitored for a specific purpose;

providing settings of the defined specific events in a plurality of registration lists;

monitoring said specific events passed from one controller to another controller of said DCE;

automatically determining if said passed specific events conform with any of the settings of the defined specific events;

notifying a specific event consumer of the occurrence of said specific events that meet a criteria of said specific purpose;

using said specific event consumer to automatically report the occurrence of said specific events that meet a criteria of said specific purpose by using one of a plurality of filters that are independently defined in accordance with pre-established criteria, wherein the filter used is associated with said specific event consumer to determine which final event consumer is to receive said report and in which of a plurality of available formats said report is provided; and recording a log of event activity involving only said specific events.

2. A method of observing events as recited in claim 1 further comprising the step of storing filtering criteria that is used to filter specific events that occur so that only notification of events meeting the stored filtering criteria is sent.

3. A method of observing events as recited in claim 2 wherein said stored filtering criteria specifies at least one event consumer and the filtering criteria associated with the at least one event consumer.

4. A method of observing events as recited in claim 1 wherein said global event registry is accessible to a plurality of servers so that each of said plurality of servers can access the list of events and the corresponding list of servers stored in said global event registry.

5. A method of observing events as recited in claim 1 wherein said global event registry is distributed across a plurality of servers and wherein said plurality of servers can access said global event registry to retrieve desired information therefrom.

6. A method of observing events as recited in claim 1 further comprising the step of registering for an event by placing an entry into at least one of said global event registry or said local event registry, said entry comprising a server and a corresponding event if said entry is placed in said global event registry and said entry comprising a event consumer and a corresponding event if said entry is placed in said local event registry.

7. A method of observing events as recited in claim 1 further comprising the step of creating a new event type by placing an entry into at least one of said global event registry or said local event registry, said entry comprising a server and a corresponding new event type if said entry is placed in said global event registry and said entry comprising a event consumer and a corresponding new event type if said entry is placed in said local event registry.

8. A method of observing events as recited in claim 1 wherein the notifying step further comprises notifying a system administrator of the specific event.

9. A method of observing events as recited in claim 1 wherein the recording step comprises recording information regarding the specific events.

10. A method of observing events as recited in claim 9 wherein the recorded information is selected from the list comprising: time of occurrence, event source type, setting name, event name, class name, perpetrator, originating server, attribute name, attribute value.

11. In a distributed computer environment (DCE) that provides event globalizing of at least one event at one server in said DCE to other servers within said DCE, a method of maintaining a record of specific event activity over said DCE comprising:

storing a global event repository comprising a list of events and a corresponding list of servers in order to identify which of said servers should receive which events;

storing a local event registry comprising a list of events and a corresponding list of event consumers in order to identify which of said event consumers should receive which events;

defining specific types of events within the list of events that are to be automatically monitored for a specific purpose;

providing settings of the defined specific events in a plurality of registration lists;

monitoring said specific events passed from one controller to another controller of said DCE;

automatically determining if said passed specific events conform with any of the settings of the defined specific events;

automatically updating the local event registry based upon authorized changes to a given event or event consumer;

notifying a specific event consumer of the occurrence of said specific events that meet a criteria of said specific purpose;

using said specific event consumer to automatically report the occurrence of said specific events that meet a criteria of said specific purpose by using one of a plurality of filters that are independently defined in accordance with pre-established criteria, wherein the filter used is associated with said specific event consumer to determine which final event consumer is to receive said report and in which of a plurality of available formats said report is provided, wherein said plurality of available formats include a text file, a database and an email; and recording a log of event activity involving only said specific events.

12. A method of observing events as recited in claim 11 further comprising the step of storing filtering criteria that is used to filter specific events that occur so that only notification of events meeting the stored filtering criteria is sent.

13. A method of observing events as recited in claim 12 wherein said stored filtering criteria specifics at least one event consumer and the filtering criteria associated with the at least one event consumer.

14. A method of observing events as recited in claim 11 wherein said global event registry is accessible to a plurality of servers so that each of said plurality of servers can access the list of events and the corresponding list of servers stored in said global event registry.

15. A method of observing events as recited in claim 11 wherein said global event registry is distributed across a plurality of servers and wherein said plurality of servers can access said global event registry to retrieve desired information therefrom.

16. A method of observing events as recited in claim 11 wherein said notifying step further comprises evaluating a set of rules to determine the specific event consumer to notify.

17. A method of observing events as recited in claim 11 wherein said notifying step further comprises filtering said specific event to match said specific event to an appropriate event consumer.

18. A method of observing events as recited in claim 11 wherein the notifying step further comprises notifying a system administrator of the specific event.

19. A method of observing events as recited in claim 11 wherein the recording step comprises recording information regarding the specific events.

20. A method of observing events as recited in claim 19 wherein the recorded information is selected from the list comprising: time of occurrence, event source type, setting name, event name, class name, perpetrator, originating server, attribute name, attribute value.

21. In a distributed computer environment (DCE) that provides event globalizing of at least one event at one server in said DCE to other servers within said DCE, a method of maintaining a record of specific event activity over said DCE comprising:

storing a global event repository comprising a list of events and a corresponding list of servers in order to identify which of said servers should receive which events;

storing a local event registry comprising a list of events and a corresponding list of event consumers in order to identify which of said event consumers should receive which events;

identifying specific types of events within the list of events that are to be monitored for a specific purpose;

providing settings of the identified specific events in a plurality of registration lists;

monitoring said specific events passed from one controller to another controller of said DCE;

automatically determining if said passed specific events conform with any of the settings of the identified specific events;

automatically updating the local event registry based upon authorized changes to a given event or event consumer;

notifying a specific event consumer of the occurrence of said specific events that meet a criteria of said specific purpose;

using said specific event consumer to automatically report the occurrence of said specific events that meet a criteria of said specific purpose by using one of a plurality of filters that are independently defined in accordance with pre-established criteria, wherein the filter used is associated with said specific event consumer to determine which final event consumer is to receive said report and in which of a plurality of available formats said report is provided;

revoking a specific event that is not authorized; and recording a log of event activity involving only said specific events.

22. A method of observing events as recited in claim 21 further comprising the step of storing filtering criteria that is used to filter specific events that occur so that only notification of events meeting the stored filtering criteria is sent.

23. A method of observing events as recited in claim 22 wherein said stored filtering criteria specifies at least one event consumer and the filtering criteria associated with the at least one event consumer.

24. A method of observing events as recited in claim 21 wherein said global event registry is accessible to a plurality of servers so that each of said plurality of servers can access the list of events and the corresponding list of servers stored in said global event registry.

25. A method of observing events as recited in claim 21 wherein said global event registry is distributed across a plurality of servers and wherein said plurality of servers can access said global event registry to retrieve desired information therefrom.

26. A method of observing events as recited in claim 21 wherein said notifying step further comprises evaluating a set of rules to determine the specific event consumer to notify and which specific events are unauthorized.

27. A method of observing events as recited in claim 21 wherein said notifying step further comprises filtering said specific event to match said specific event to an appropriate event consumer.

28. A method of observing events as recited in claim 21 wherein the notifying step further comprises notifying a system administrator of the unauthorized specific event.

29. A method of observing events as recited in claim 21 wherein the recording step comprises recording information regarding the specific events.

30. A method of observing events as recited in claim 29 wherein the recorded information is selected from the list comprising: time of occurrence, event source type, setting name, event name, class name, perpetrator, originating server, attribute name, attribute value.

31. A distributed computer environment (DCE) system comprising:

a system directory;

a least one server, coupled to the system directory;

at least one global event services controller, coupled to the system directory, to globalize at least one event at said at least one server to other servers within said DCE, wherein a local event registry is stored maintained by the at least one global event services controller, the local event registry comprising a list of events and a corresponding list of servers in order to identify which of said servers should receive which events and a list of events and a corresponding list of event consumers that identify which of said event consumers should receive which local events;

a data alert controller, coupled to said at least one global event services controller, to monitor specific events passed from the global event services controller to the data alert controller of the DCE, to notify a specific event consumer of the occurrence of the specific events, and to record a log of event activity involving only said specific events, wherein said specific events meet a criteria of a specific purpose; and at least one of a plurality of filters that are independently defined in accordance with pre-established criteria wherein the filter is communicatively coupled to said data alert controller to determine which final event consumer is to receive a report of said specific events and in which of a plurality of available formats said report is provided.

32. The DCE system as recited in claim 31 further comprising at least one filter, associated with each specific event consumer and coupled to the data alert controller, to filter specific events using defined filtering criteria so that only notification of events meeting the stored filtering criteria is sent.

33. The DCE system as recited in claim 32 wherein said stored filtering criteria specifies at least one event consumer and the filtering criteria associated with the at least one event consumer.

34. The DCE system as recited in claim 31 wherein said global event registry is accessible to a plurality of servers so that each of said plurality of servers can access the list of events and the corresponding list of servers stored in said global event registry.

35. The DCE system as recited in claim 31 wherein said global event registry is distributed across a plurality of servers and wherein said plurality of servers can access said global event registry to retrieve desired information therefrom.

36. The DCE system as recited in claim 31 further comprising a rules controller, coupled to the data alert controller to evaluate a set of rules to determine the specific event consumer to notify and which specific events are unauthorized.

37. The DCE system as recited in claim 31 further comprising a registration filter, coupled to the data alert controller, to filter said specific event to match said specific event to an appropriate event consumer.

38. The DCE system of claim 31 wherein the data alert controller also notifies a system administrator of the unauthorized specific event.

39. The DCE system of claim 31 wherein the log record comprises information regarding the specific events.

40. The DCE system as recited in claim 39 wherein the information is selected from the list comprising: time of occurrence, event source type, setting name, event name, class name, perpetrator, originating server, attribute name, attribute value.

41. The DCE system as recited in claim 31 wherein the global event services controller updates the local event registry based upon authorized changes to a given event or event consumer.

42. The DCE system as recited in claim 31 wherein the data event controller revokes a specific event that is not authorized.

43. The DCE system as recited in claim 36 wherein each event consumer utilizes the set of rules to determine what action to take.

* * * * *